United States Patent Office 3,123,622
Patented Mar. 3, 1964

3,123,622
1-DEHYDRO AND 1,6-DEHYDRO DERIVATIVES OF 15-OXYGENATED PREGN-4-ENE-3,20-DIONES
Robert C. Tweit, Wilmette, Ill., assignor to G. D. Searle & Co., Chicago, Ill., a corporation of Delaware
No Drawing. Filed June 16, 1961, Ser. No. 117,533
6 Claims. (Cl. 260—397.3)

The present invention relates to unsaturated 3,15,20-trisoxygenated steroids of the pregnane series and, more particularly, to 1-dehydro and 1,6-dehydro derivatives of 15-oxygenated pregn-4-ene-3,20-diones as represented by the structural formulae

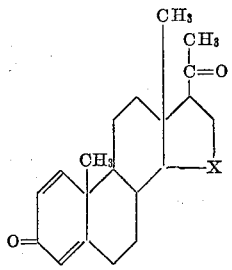

and

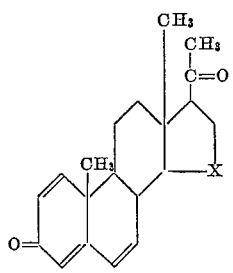

wherein X is a carbonyl, β-hydromethylene, or β-(lower alkanoyl) oxymethylene group.

The lower alkanoyl radicals encompassed by X are exemplified by formyl, acetyl, propionyl, butyryl, valeryl, caproyl, and the branched-chain isomers thereof.

The compounds of this invention are conveniently prepared by utilizing 15β-hydroxypregn-4-ene-3,20-dione and 15β-hydroxypregna-4,6-diene-3,20-dione as starting materials. The reaction of these compounds with a dehydrogenating agent produces the corresponding 1-dehydro derivatives as is typified by the dehydrogenation of 15β-hydroxypregn-4-ene-3,20-dione by treatment with 2,3-dichloro-5,6-dicyanoquinone in an organic solvent medium to yield 15β-hydroxypregna-1,4-diene-3,20-dione. This 1,2-dehydrogenation reaction can be accomplished also by the use of suitable microorganisms, for example, *Corynebacterium simplex*, as well as by means of other chemical reagents such as selenium dioxide.

The instant 15-oxo compounds can be obtained by oxidation of the aforementioned 15β-hydroxy substances of this invention. Typically, 15β-hydroxypregna-1,4,6-triene, 3,20-dione in acetone is treated with aqueous chromic acid to afford pregna-1,4,6-triene-3,15,20-trione.

The instant 15β-hydroxy compounds can be converted to the corresponding alkanoate esters by reaction with a lower alkanoic acid anhydride in the presence of a suitable acid acceptor. As a specific example of this process, 15β-hydroxypregna-1,4-diene-3,20-dione is converted to 15β-acetoxypregna-1,4-diene-3,20-dione by reaction with acetic anhydride and pyridine.

The compounds of this invention are useful as antibacterial agents as is evidenced by their ability to inhibit the growth of *Diplococcus pneumoniae*. They display also valuable pharmacological properties. They are, for example, potent oral diuretic agents in view of their ability to block the effect of aldosterone-like substances on urinary sodium.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

A mixture of 5.17 parts of 15β-hydroxypregn-4-ene-3,20-dione, 4.1 parts of 2,3-dichloro-5,6-dicyanoquinone, and 61.8 parts of dioxane is heated at reflux for about 5½ hours, then allowed to cool to room temperature and filtered. The filtrate is concentrated to dryness at reduced pressure, and the resulting residue is crystallized first from acetone, then from methylene chloride-acetone to afford 15β-hydroxypregna-1,4-diene-3,20-dione, M.P. about 230–233°.

Example 2

To a solution of 1.6 parts of 15β-hydroxypregna-1,4-diene-3,20-dione in 200 parts of acetone, cooled by means of an ice bath, is added dropwise 1.5 parts of an aqueous solution, 8 N in chromium trioxide and 8 N in sulfuric acid. The reaction mixture is stirred for about 5 minutes, then poured into water and extracted with methylene chloride. The organic solution is dried over anhydrous sodium sulfate and concentrated to dryness at reduced pressure. Recrystallization of the residue from acetone-ether produces pregna-1,4-diene-3,15,20-trione, M.P. about 207–209.5°.

Example 3

A mixture of 5.17 parts of 15β-hydroxypregna-4,6-diene-3,20-dione, 4.1 parts of 2,3-dichloro-5,6-dicyanoquinone, and 60 parts of dioxane is heated at reflux for about 4 hours, then cooled and filtered. The filtrate is concentrated to dryness in vacuo, and the residue is triturated with acetone-ether, then crystallized from methylene chloride-methanol-acetone to yield 15β-hydroxypregna-1,4,6-triene-3,20-dione, M.P. about 241.5–244°.

Example 4

To a slurry of one part of 15β-hydroxypregna-1,4,6-trieriene-3,20-dione in 104 parts of acetone is added 0.89 part by volume of an aqueous solution, 8 N in chromium trioxide and 8 N in sulfuric acid, and the resulting solution is stirred for about 5 minutes longer, than diluted with water. This aqueous mixture is partially concentrated, then is extracted with methylene chloride. The organic solution is concentrated to dryness at reduced pressure, and the resulting residue is dissolved in ethyl acetate-benzene, then is chromatographed on silica gel. Elution with 20% ethyl acetate in benzene followed by recrystallization from methylene chloride affords pregna-1,4,6-triene-3,15,20-trione, M.P. about 186–187.5°.

Example 5

A mixture of one part of 15β-hydroxypregna-1,4-diene-3,20-dione, 10 parts of acetic anhydride, and 20 parts of pyridine is heated at about 100° to achieve homogeneity, then is stored at room temperature for about 7 days. Water is added and the resulting aqueous mixture is made slightly alkaline by the addition of sodium carbonate. Extraction with methylene chloride affords an organic solution, which is washed with water, and evaporated to dryness at reduced pressure. The resulting residue is adsorbed on silica gel, and the chromatographic column is eluted with ethyl acetate-benzene mixtures to afford 15β-acetoxypregna-1,4-diene-3,20-dione.

By substituting one part of 15β-hydroxypregna-1,4,6-triene-3,20-dione and otherwise proceeding according to the herein described processes, 15β-acetoxypregna-1,4,6-triene-3,20-dione is obtained.

*Example 6*

The reaction of 13 parts of propionic anhydride with one part of 15β-hydroxypregna-1,4-diene-3,20-dione or one part of 15β-hydroxypregna-1,4,6-triene-3,20-dione according to the procedure of Example 5 results in 15β-propionoxypregna-1,4-diene-3,20-dione and 15β-propionoxypregna-1,4,6-triene-3,20-dione, respectively.

What is claimed is:
1. A compound of the structural formula

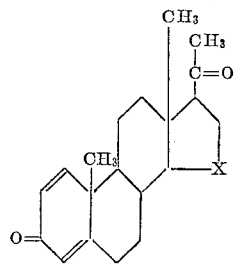

wherein X is selected from the group consisting of carbonyl, β-hydroxymethylene, and β-(loweralkanoyl)oxymethylene radicals.

2. A compound of the structural formula

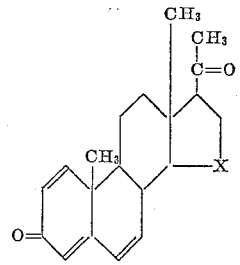

wherein X is selected from the group consisting of carbonyl, β-hydroxymethylene, and β-(lower alkanoyl)oxymethylene radicals.

3. Pregna-1,4-diene-3,15,20-trione.
4. 15β-hydroxypregna-1,4-diene-3,20-dione.
5. Pregna-1,4,6-triene-3,15,20-trione.
6. 15β-hydroxypregna-1,4,6-triene-3,20-dione.

References Cited in the file of this patent
UNITED STATES PATENTS

| | | |
|---|---|---|
| 2,837,464 | Nobile | June 3, 1958 |
| 2,879,280 | Fried et al. | Mar. 24, 1959 |
| 2,924,611 | Dodson et al. | Feb. 9, 1960 |